Figure 1:
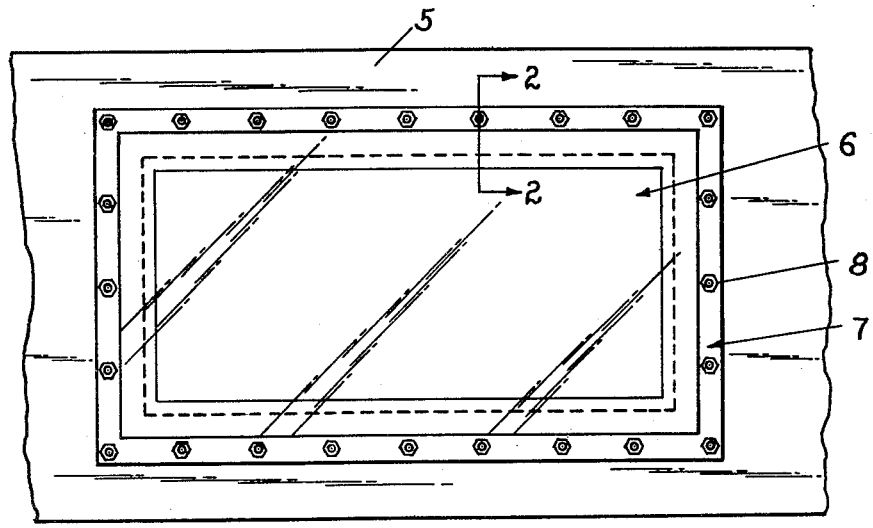

Oct. 30, 1962  J. D. RYAN  3,061,490
LAMINATED SAFETY GLASS
Filed Sept. 23, 1959

INVENTOR.
Joseph D. Ryan
BY
Nobbe & Swope
ATTORNEYS

United States Patent Office 3,061,490
Patented Oct. 30, 1962

3,061,490
LAMINATED SAFETY GLASS
Joseph D. Ryan, Toledo, Ohio, assignor to Libbey-Owens-Ford Glass Company, Toledo, Ohio, a corporation of Ohio
Filed Sept. 23, 1959, Ser. No. 841,871
18 Claims. (Cl. 154—2.74)

This invention relates broadly to laminated safety glass and more particularly to an improved plastic interlayer material for use in laminated glass glazing units and to a method of preparing the same.

This application is a continuation-in-part of my copending application Serial No. 786,961, filed January 15, 1959, now abandoned.

In recent years the laminated glass industry has been faced with an ever increasing demand for aircraft glazing units having high temperature stability greatly in excess of conventional laminated glazing units made with plastic interlayer material such as plasticized polyvinyl butyral. Aircraft now being considered as additions to the airpower inventory have requirements in a temperature range which is much higher than the maximum at which vinyl interlayer material is useable.

The search for a new high temperature-resistant laminating plastic which could be used in place of the polyvinyl butyral plastic interlayer in laminated glazing units has been pushed vigorously. One particularly successful material has been developed by Dow-Corning Corporation, Midland, Michigan, and is known as a "type K" silicone interlayer which is furnished in the form of an uncured, soft plastic sheet calendered between two pieces of polyethylene coated paper. In this state, the silicone interlayer is readily flowable under pressure; but during the laminating cycle, it cures to a tough, elastic, cross-linked transparent rubber-like material. In the cured state, the optical and physical properties of this interlayer material are comparable in certain respects to the polyvinyl butyral plastic interlayer material while in other respects they are far superior. Thus, while the strength of the silicone layer at room temperature is somewhat less than that of the polyvinyl butyral layer, the tensile strength is not affected at appreciably higher temperatures whereas the tensile strength of the polyvinyl butyral interlayer rapidly diminishes, so that at 160° F. the silicone interlayer material exhibits approximately six times the tensile strength of the polyvinyl butyral interlayer. Laminates constructed with a silicone interlayer exhibit slightly less desirable transmittance characteristics which, however, do not limit their usefulness to any substantial degree.

When installed in aircraft, laminates formed from tempered glass having silicone interlayers are so designed that the edge construction of the laminate is comprised of extending edge portions of cured rubbery silicone material provided with a thin aluminum insert for added strength. This edge construction is designed to provide a surface whereby the laminate may be secured to the fuselage assembly of aircraft by means of suitable retaining bolts and the use of an adhesive layer between the cured silicone and the wall of the fuselage.

It has been found in actual operating conditions that such laminates have a tendency to break down, the combination of light radiation and exposure to the atmosphere causing the silicone layer at the exposed edges and in the interlayer material immediately adjacent thereto to lose its resilience to the extent that the silicone material actually becomes weak and friable.

It is therefore the primary object of this invention to provide a rubber-like silicone material which, upon exposure to light and atmospheric conditions, will retain its original physical characteristics.

Another object of this invention is to provide a laminated glazing unit which will have good stability at high temperatures and which will not deteriorate in actual use.

These and other objects will become more evident as the description proceeds.

Figure 2:
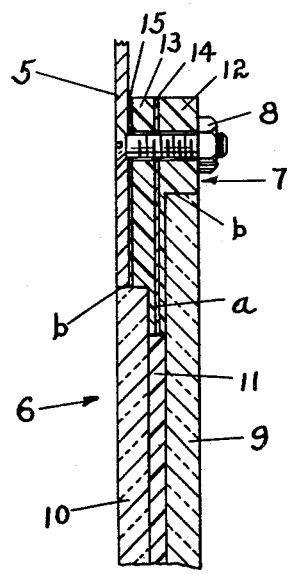

In the drawings:

FIG. 1 is a diagrammatic representation of a glazing unit attached to a fuselage section of an aircraft; and FIG. 2 is an enlarged cross-sectional view taken along the line 2—2 of FIG. 1.

I have discovered that the tendency of the rubbery silicone interlayer material to deteriorate due to exposure to light radiation and to atmospheric conditions can be overcome by compounding this silicone interlayer material with inert inorganic pigments. I have also discovered that by compounding the uncured silicone material with inert inorganic pigments, the compounded silicone material will resist deterioration upon exposure to light and atmospheric conditions so that even after six months' exposure the exposed extended edges formed in accordance with my invention retain all their original desirable physical characteristics. Although not all inorganic pigments exhibit the desired characteristics to the same extent as will be shown by the subsequent discussion, it is believed that the addition of any inorganic non-reactive pigment to the silicone material will inhibit deterioration substantially completely.

The Dow-Corning "type K" silicone interlayer material used in preparing laminates according to the method of my invention is a transparent polymethyl siloxane elastomer which has been especially compounded for use in aircraft glazing units. This silicone material is furnished as an uncured, soft plastic sheet which is readily flowable under pressure and which cures, during the laminating cycle, to a tough, elastic, cross-linked transparent rubber-like material which can be firmly bonded to the outer glass sheets or plates. It is believed that any silicone elastomeric material may be used for the interlayer material which, on curing, sets up into a tough, transparent, rubber-like interlayer firmly bonded to the surface of the glass sheets immediately in contact therewith.

I have found that not all inorganic pigments can be used in all proportions when compounding the "type K" silicone material since some of them inhibit the curing reaction which converts the silicone elastomeric material from a soft, putty-like plastic to a tough elastomer. Thus, I have found that, when the silicone plastic material was compounded with 20 to 50 parts of carbon black, the silicone failed to cure. After autoclaving and exposure to the post curing cycle, these samples were unchanged, remaining in a soft, putty-like condition. Another sample of silicone elastomer which had been compounded with 20 parts of metallic aluminum powder behaved in the same manner, that is, it showed no evidence of curing. However, by reducing the carbon black content to 5 parts, a partial cure was obtained.

In order to evaluate various pigmented compositions, 3" x 5" laminates having ⅛" plate glass sheets and .080" thick interlayers were prepared. The interlayer materials were compounded on mixing rolls and afterwards, the test samples were autoclaved in a vacuum bag at 300° F. for approximately ½ hour after which the laminates were removed from the vacuum bags and post cured in an air oven at 300° F. for a period of 48 hours. The laminates were then cut into ½" x ½" squares, cemented to steel blocks and pulled apart in a tensile testing machine. The results of these tests are tabulated below.

(1) Control sample, milled silicone interlayer:

| Sample No. | Pounds | Type of separation |
|---|---|---|
| 1 | 128 | Cohesively—Interlayer pulled apart. |
| 2 | 113 | Do. |
| 3 | 110 | Do. |
| Average | 117 | |

(2) Calcium carbonate compounded with "type K" silicone: Extensive tensile pull tests were run using calcium carbonate in various combinations with the silicone. The rate of pull was 0.05" per minute at 74° F. The test data are summarized below.

| Parts/100 parts silicone | Control, breaking load in lbs. | 72 hrs.—100% relative humidity at 140° F., breaking load in lbs. | 72 hrs. in $H_2O$ at room temperature, breaking load in lbs. |
|---|---|---|---|
| 7.5 $CaCO_3$ | 107.5 cohesive [1] | 65.0 adhesive [1] | 86.7 cohesive. |
| 15 $CaCO_3$ | 97.5 cohesive | 73.33 adhesive | 78.33 adhesive. |
| 20 $CaCO_3$ | 110.0 cohesive | 76.67 adhesive | 76.67 adhesive. |
| 25 $CaCO_3$ | 100.0 cohesive | 70.0 adhesive | 75.0 adhesive. |

[1] Cohesive—Interlayer pulled apart. Adhesive—Interlayer from the glass.

So-called lap shear tests were also run wherein a laminate was prepared comprising generally a sheet of aluminum bonded between two layers of silicone between glass. Part of the aluminum extended beyond the glass. The test consisted of pulling the aluminum sheet edgewise out of the silicone. The aluminum sheet was approximately 2" x 6" with about a 1" x 6" strip between the glass.

All samples were tested at 260° F. at 0.05" per minute.

| Parts | Control breaking load in lbs. | 72 hrs. in water at room temperature breaking load in lbs. | 72 hrs. at 100% R.H. at 140° F. breaking load in lbs. |
|---|---|---|---|
| Clear silicone build-up | 1,350 | 1,125.0 | 1,290.0 |
| 7.5 $CaCO_3$ | 2,057.5 | 1,780.0 | 1,870.0 |
| 15 $CaCO_3$ | 2,192.5 | 2,167.5 | 2,020.0 |
| 20 $CaCO_3$ | 2,062.5 | 2,167.5 | 2,045.0 |
| 25 $CaCO_3$ | 2,135.0 | 2,005.0 | 2,155.0 |

(3-a) 100 parts titanium dioxide by weight to 100 parts by weight of "type K" silicone:

| Sample No. | Pounds | Type of separation |
|---|---|---|
| 1 | 130.0 | Cohesively—Interlayer pulled apart. |
| 2 | 130.5 | Do. |
| 3 | 126.0 | Do. |
| Average | 128.8 | |

(3-b) 100 parts titanium dioxide by weight to 100 parts by weight of "type K" silicone:

| Sample No. | Pounds | Type of separation |
|---|---|---|
| 1 | 55.5 | Adhesively—Interlayer from the glass. |
| 2 | 46.0 | Do. |
| 3 | 55.5 | Do. |
| Average | 52.3 | |

(4) 20 parts iron oxide by weight to 100 parts by weight of silicone:

| Sample No. | Pounds | Type of separation |
|---|---|---|
| 1 | 77½ | ½" expansion then separated cohesively—Interlayer pulled apart. |
| 2 | 69½ | Do. |
| 3 | 71½ | Do. |
| Average | 72.83 | |

(5) Silicone interlayer with 20 parts A.S.P. #100 aluminum silicate pigment.

| Sample No. | Pounds | Type of separation |
|---|---|---|
| 1 outside | 81 | Cohesively—Interlayer pulled apart. |
| 2 outside | 85 | ½ adhesively, ½ cohesively. |
| 3 center | 91 | Adhesively—Small amount of white on the other glass. |
| 4 center | 71 | ⅞ adhesively, ⅛ cohesively. |
| 5 outside | 95 | ⅓ adhesively, ⅔ cohesively. |
| 6 outside | 91 | ⅛ adhesively, ⅞ cohesively. |
| Average | 85.7 | |

(6) Silicone interlayer with 5 parts carbon black (Statex 125):

| Sample No. | Pounds | Type of separation |
|---|---|---|
| 19 outside | 56.00 | Cohesively—Interlayer pulled apart, one corner of glass broke off. |
| 20 outside | 60.00 | Cohesively—Interlayer pulled apart. |
| 21 Center | 60.00 | Do. |
| 22 Center | 61.00 | Do. |
| Average | 59.25 | |

(7) Zinc chromate compounded with "type K" silicone: Tensile pull tests were run using zinc chromate and basic zinc chromate at a ratio of 20 parts per 100 parts of silicone. The rate of pull was 0.05" per minute at 74° F. The test data are summarized below:

| Parts/100 parts silicone | Control breaking load in lbs. | 72 hrs.—100% relative humidity at 140° F., breaking load in lbs. | 72 hrs. in $H_2O$ at room temperature, breaking load in lbs. |
|---|---|---|---|
| 20 zinc chromate | 70 adhesive | 40 adhesive | 60 adhesive. |
| 20 basic zinc chromate | 72.5 adhesive | 41.67 adhesive | 61.67 adhesive. |

These tests were designed to show specifically the effect of the inorganic pigments on the physical properties of the "type K" silicone material upon compounding and curing using standard production procedures. The results indicate that the physical characteristics of the cured silicone may be varied considerably. It appears that the silicone interlayer compounded with 20 parts by weight titanium dioxide to 100 parts by weight silicone was not detrimentally affected by the incorporation of the $TiO_2$ pigment therewith. In fact, the physical properties of this interlayer were actualy slightly improved in that 128.8 pounds average was required to pull the interlayer apart as contrasted with 117 pounds average required to pull the control sample (plain milled silicone) interlayer apart. The type of separation in both cases was cohesive which means that the bonds within the interlayer itself were ruptured before the bonds established between the glass and the cured silicone.

By varying the amount of individual pigment used in compounding, it is possible to determine the optimum quantity of pigment to use. Preferably, depending upon the characteristics of the individual pigment, approximately 1 to 50 parts by weight of pigment to 100 parts by weight of silicone may be used in compounding.

It is believed that the pigment material, when compounded with the silicone elastomer, on curing, acts to shield the cured rubber-like silicone material from the effect of light rays and it is believed that theoretically the opaqueness developed, upon compounding with the pigmented material, achieves this desirable end result. It is also believed that the effectiveness of the pigments depends on the extent to which they do not affect the curing of the silicone elastomeric material; and other non-reactive inorganic pigment material such as barites, titanium-calcium pigments, titanium-barium pigments, silica, magnesium silicate, aluminum oxide and various iron oxide pigments may also be used.

Although the manner in which exposure to atmospheric conditions brings about degradation of the silicone interlayer material is not at present understood, it is felt that the diffusion of gases within the silicone layer also acts to cause deterioration. It is believed that this effect is additive and/or catalytic to the effect of the light radiation. Whatever the cause of deterioration might be, however, I have found that the incorporation of the inorganic pigment in the silicone elastomeric material substantially completely eliminates the degradation of this material.

For sake of clarity and referring to the drawings, FIG. 1 diagrammatically represents a portion 5 of an aircraft fuselage structure showing a typical glazing unit 6 secured thereto by means of an extended edge portion 7 through which suitable bolts 8 are fastened into the fuselage.

FIG. 2 is an enlarged cross-sectional view taken along the line 2—2 of FIG. 1 and shows the laminated glazing unit in greater detail. The glazing unit 6 comprises the two sheets of glass 9 and 10 bonded to a clear silicone plastic interlayer 11. The extended edge 7 is formed of two or more layers 12 and 13 of cured pigmented silicone elastomer bonded to the opposite sides of a metal insert 14, preferably aluminum. As shown, the two layers 12 and 13 extend a short distance inwardly between the glass sheets as at $a$ and also preferably overlap the outer edges of the sheets as at $b$. As stated above, bolts 8 are passed through the extended edge 7 and fuselage 5 to secure the glazing unit in place. If desired, a layer 15 of adhesive material may be interposed between the fuselage and the extended edge.

Test laminates were made in accordance with the structure of glazing unit 6 shown in FIG. 2 in order to determine the effect of exposure on the pigmented silicone elastomer materials. In evaluating the effect of exposure of pigmented silicone elastomer materials, test laminates were prepared according to the following examples:

| Kind of glass | Plastic used | Interlayer thickness | Extended edges |
|---|---|---|---|
| ¼″ tempered plate. | Type "K" silicone.. | .105 | Contained titanium dioxide milled into silicone type "K." |
| Do. | ....do............... | .105 | Contained iron oxide milled into silicone type "K." |

These test laminates were exposed to the weather along with a control laminate manufactured with unpigmented silicone interlayer material in its extended edges. After three months of exposure to the elements in Florida the extended edges, compounded from the pigmented silicone interlayer material, remained in perfect shape, i.e. there was no sign of deterioration, whereas the extended edges of the control laminate manufactured with unpigmented silicone interlayer material showed severe degradation of the exposed silicone material even to the extent that the silicone interlayer material had begun to break down around the edge portions immediately between the edges of the tempered glass sheets.

The laminates having edges formed from pigmented silicone material were returned to Florida for an additional exposure period of three months and it was found that the extended edge portions still remained in perfect shape at the end of the second three-month period.

When reference is made to the breakdown exhibited by the silicone interlayer material to which no inorganic pigment was added, the physical breakdown occurs in that the silicone material loses its resilience and becomes weak and friable to the extent that the exposed layers actually break up into small pieces which fall off the edges and the immediately adjacent layers of silicone material tend to exhibit brittleness and cracking. Thus, it appears that the breakdown is due to exposure to atmospheric conditions in combination with exposure to light radiation.

It is to be understood that the forms of the invention disclosed herein are to be taken as the preferred embodiments, and that various changes may be resorted to without departing from the spirit of the invention or the scope of the following claims.

I claim:

1. A laminated safety glass unit having an extended edge fastening portion which is resistant to decomposition by light and atmosphere, comprising two sheets of glass, a first layer of clear cured polymethyl siloxane elastomer interposed between and bonding said sheets of glass together, and an edge unit for said laminate comprising a second cured polymethyl siloxane elastomer layer having a portion thereof located between the sheets of glass, and another portion projecting beyond the edges of the glass sheets, said second cured polymethyl siloxane elastomer layer having from 1 to 50 parts by weight of calcium carbonate intimately admixed with each 100 parts by weight thereof.

2. In a laminated safety glass unit comprising a pair of glass sheets and an interlayer of synthetic resin interposed between and bonded to the glass sheets, said interlayer terminating inwardly of the edges of the glass sheets, a layer of cured polymethyl siloxane resin having calcium carbonate incorporated therein interposed between the marginal edge portions of the glass sheets around said interlayer and also bonded to the glass sheets, said layer of polymethyl siloxane resin extending outwardly beyond the edges of the glass sheets to provide a mounting flange.

3. A laminated safety glass unit having an extended edge fastening portion which is resistant to decomposition by light and atmosphere, comprising two sheets of glass, a layer of clear cured polymethyl siloxane resin interposed between and bonding said sheets of glass together, and an edge unit for said laminate comprising a second cured polymethyl siloxane resin layer having a portion thereof located between the sheets of glass and bonded thereto and another portion projecting beyond the edges of the glass sheets, said second cured polymethyl siloxane resin layer having from 1 to 50 parts by weight of an inorganic pigment intimately admixed with each 100 parts by weight thereof.

4. A laminated safety glass unit as defined in claim 3, wherein the inorganic pigment is titanium dioxide.

5. A laminated safety glass unit as defined in claim 4, wherein 15 to 25 parts by weight of titanium dioxide are employed for each 100 parts by weight of siloxane resin.

6. A method of fabricating a safety glass laminate having an extended edge fastening portion which is resistant to decomposition by light and atmosphere, comprising providing spaced sheets of glass, interposing a layer of synthetic resin between at least a portion of said glass sheets, interposing a layer of uncured polymethyl siloxane resin having an inorganic pigment intimately incorporated therein between the marginal edge portions of the glass sheets outwardly of the layer of synthetic resin, said pigmented layer extending beyond the edges of the glass sheets to provide a fastening portion, and subjecting said assembly to heat and pressure to cure said polymethyl siloxane resin to an elastomeric state and bond said sheets of glass to said layer of synthetic resin and also to said layer of polymethyl siloxane resin.

7. A method as defined in claim 6, wherein about 100 parts by weight of resin are intimately combined with 1 to 50 parts by weight of an inorganic pigment.

8. A method as defined in claim 7, wherein the inorganic pigment is titanium dioxide.

9. A method as defined in claim 8, wherein 15 to 25 parts by weight of titanium dioxide are employed to 100 parts by weight of the resin.

10. A laminated safety glass unit as in claim 3, wherein the inorganic pigment is about 20 parts by weight of iron oxide.

11. A laminated safety glass unit as in claim 3, wherein the inorganic pigment is about 20 parts by weight of A.S.P. #100 aluminum silicate pigment.

12. In a laminated safety glass unit, comprising a pair of glass sheets and an interlayer of synthetic resin interposed between and bonded to the glass sheets, said interlayer terminating inwardly of the edges of the glass sheets, and a layer of cured polymethyl siloxane resin having an inorganic pigment incorporated therein interposed between the marginal edge portions of the glass sheets around said interlayer and also bonded to the glass sheets, said layer of polymethyl siloxane resin extending outwardly beyond the edges of the glass sheets to provide a mounting flange.

13. A method as defined in claim 6, wherein the inorganic pigment is calcium carbonate.

14. A method as defined in claim 6, wherein the inorganic pigment is carbon black.

15. A laminated safety glass unit as defined in claim 12, wherein the inorganic pigment is titanium dioxide.

16. A laminated safety glass unit as defined in claim 12, wherein the inorganic pigment is iron oxide.

17. A laminated safety glass unit as defined in claim 12, wherein the inorganic pigment is A.S.P. #100 aluminum silicate pigment.

18. A laminated safety glass unit as defined in claim 12, wherein the inorganic pigment is carbon black.

References Cited in the file of this patent

UNITED STATES PATENTS

| | | |
|---|---|---|
| 2,398,886 | Drake et al. | Apr. 23, 1946 |
| 2,492,129 | Sprung | Dec. 20, 1949 |
| 2,502,286 | Sowa | Mar. 28, 1950 |
| 2,504,388 | Braley | Apr. 18, 1950 |
| 2,601,337 | Smith-Johannsen | June 24, 1952 |
| 2,692,844 | Hyde | Oct. 26, 1954 |
| 2,756,171 | Thomas | July 24, 1956 |

UNITED STATES PATENT OFFICE
CERTIFICATE OF CORRECTION

Patent No. 3,061,490                            October 30, 1962

Joseph D. Ryan

It is hereby certified that error appears in the above numbered patent requiring correction and that the said Letters Patent should read as corrected below.

Column 3, line 46, for "(3-a) 100 parts" read -- (3-a) 20 parts --.

Signed and sealed this 30th day of April 1963.

(SEAL)
Attest:

ERNEST W. SWIDER
Attesting Officer

DAVID L. LADD
Commissioner of Patents